(12) United States Patent
Morisawa et al.

(10) Patent No.: US 8,668,067 B2
(45) Date of Patent: Mar. 11, 2014

(54) VEHICLE PARKING LOCK DEVICE

(75) Inventors: Kunio Morisawa, Toyota (JP);
Shigetsugu Iwata, Toyota (JP); Takuya Kodama, Toyota (JP); Takafumi Koshida, Anjo (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 179 days.

(21) Appl. No.: 13/390,401

(22) PCT Filed: Aug. 27, 2009

(86) PCT No.: PCT/JP2009/065005
§ 371 (c)(1),
(2), (4) Date: Feb. 14, 2012

(87) PCT Pub. No.: WO2011/024284
PCT Pub. Date: Mar. 3, 2011

(65) Prior Publication Data
US 2012/0168275 A1    Jul. 5, 2012

(51) Int. Cl.
*B60T 1/06*     (2006.01)
*F16H 63/34*    (2006.01)

(52) U.S. Cl.
USPC ........................................ 192/219.5; 188/69

(58) Field of Classification Search
USPC ....................................................... 192/219.5
See application file for complete search history.

(56) References Cited

U.S. PATENT DOCUMENTS

| | | | |
|---|---|---|---|
| 4,585,103 A | | 4/1986 | Kuwayama et al. |
| 4,614,256 A | * | 9/1986 | Kuwayama et al. ....... 192/219.5 |
| 4,719,999 A | * | 1/1988 | Ohkubo ...................... 192/219.5 |
| 4,727,967 A | * | 3/1988 | Ogasawara et al. ........ 192/219.5 |
| 7,284,648 B2 | * | 10/2007 | Reed et al. ................. 192/219.5 |

FOREIGN PATENT DOCUMENTS

| | | |
|---|---|---|
| JP | A-58-207573 | 12/1983 |
| JP | A-62-128864 | 6/1987 |
| JP | A-2003-276581 | 10/2003 |
| JP | A-2008-064233 | 3/2008 |
| JP | A-2008-132805 | 6/2008 |

OTHER PUBLICATIONS

"Toyota A240E Manual for Repairing Automatic Transaxle," May 1983 (With Translation).
"Toyota A240E A241E Manual for Repairing Automatic Transaxle," Dec. 1986 (With Translation).
International Search Report issued in Application No. PCT/JP2009/065005; Dated Sep. 29, 2009 (With Translation).

* cited by examiner

*Primary Examiner* — Rodney Bonck
(74) *Attorney, Agent, or Firm* — Oliff PLC

(57) ABSTRACT

A vehicle parking lock device having a parking rod; a tapered parking cam disposed at a leading end portion of the parking rod; and a cam guiding device that guides the parking cam moved together with the parking rod in association with a projection of the parking rod toward the leading end portion to move a parking lock pole with the parking cam to a position of engagement with a parking lock gear rotated together with a transmission output member, the cam guiding device including a first guiding member in a cylindrical shape and a second guiding member in a half cylindrical shape that is disposed subsequently to the first guiding member, the second guiding member having a tapered guiding concave surface that guides the parking cam toward the parking lock pole in association with the projection of the parking rod toward the leading end portion.

11 Claims, 6 Drawing Sheets

VEHICLE PARKING LOCK DEVICE

TECHNICAL FIELD

The present invention relates to a vehicle parking lock device for non-rotatably fixing an output member of a vehicle transmission, and, more particularly, to a technique of reducing the manufacturing cost of the vehicle parking lock device.

BACKGROUND ART

A vehicle parking lock device is known that comprises a parking rod that has a base end portion rotatably coupled to a detent plate and that is projected toward a leading end portion in association with rotation of the detent plate to a parking position, a tapered parking cam disposed at the leading end portion of the parking rod, and a cam guiding device that guides the parking cam moved together with the parking rod in association with the projection of the parking rod toward the leading end portion to move a parking lock pole rotatably disposed on a transmission case with the parking cam to a position of engagement with a parking lock gear rotated together with a transmission output member. The cam guiding device includes a cam guide that retains the parking cam in a posture operable in accordance with a switching operation of a shift position of a transmission in association with the movement of the parking rod toward the leading end portion or the opposite side, a sleeve that guides the parking cam such that the parking lock pole is pushed up to the position of engagement with the parking lock gear in association with the projection of the parking rod toward the leading end portion due to the rotation of the detent plate to the parking position, and a stopper plate that guides the parking rod projected toward the leading end portion due to the rotation of the detent plate to the parking position such that the posture thereof is achieved at a predetermined position. The sleeve must have a half cylindrical shape because of the necessity of an operation space of the parking lock pole disposed on the side opposite to the sleeve relative to the parking rod. Therefore, the sleeve is difficult to be solely bound by the transmission case such that the sleeve is not moved in a radial direction, i.e., in a direction orthogonal to the shaft center, unless a flange portion for fixation to the transmission case by bolts etc., is disposed on an outer circumference portion and fixed to the transmission case by bolts etc. Therefore, in a conventional vehicle parking lock device, the sleeve is integrally configured with one or both of the cam guide and the stopper plate and is bound immovably in a radial direction relative to the transmission case via the cam guide and the stopper plate. Such a vehicle parking lock device is described in Patent Document 1 and Patent Document 2.

In Patent Document 1, the sleeve is integrally configured with the cam guide bound immovably in a radial direction by the transmission case and is bound immovably in a radial direction relative to the transmission case and, since the flange portion is disposed on the outer circumference portion on the side of the sleeve opposite to the cam guide and engaged with the stopper plate fixed to the transmission case, the sleeve is bound non-rotatably around the shaft center and immovably in a shaft center direction relative to the transmission case. In Patent Document 2, since the sleeve is integrally configured with the stopper plate and the flange portion is disposed on the outer circumference portion on the side of the sleeve opposite to the stopper plate and engaged with the cam guide fixed to the transmission case, the sleeve is bound immovably in a radial direction, non-rotatably around the shaft center, and immovably in a shaft center direction relative to the transmission case.

In another possible vehicle parking lock device, the sleeve and the stopper plate with the flange portion disposed on the outer circumference portion and fixed to the transmission case are integrally configured to bind the sleeve immovably in a radial direction, non-rotatably around the shaft center, and immovably in a shaft center direction relative to the transmission case, or the sleeve, the cam guide, and the stopper plate with the flange portion disposed on the outer circumference portion and fixed to the transmission case are integrally configured to bind the sleeve immovably in a radial direction, non-rotatably around the shaft center, and immovably in a shaft center direction relative to the transmission case.

PRIOR ART DOCUMENTS

Patent Documents

Patent Document 1: Japanese Laid-Open Patent Publication No. 2008-132805,
Patent Document 2: Japanese Laid-Open Patent Publication No. 2003-276581,

SUMMARY OF THE INVENTION

Problem to Be Solved by the Invention

In the conventional vehicle parking lock device, since the sleeve is integrally configured with one or both of the cam guide and the stopper plate, the sleeve is relatively large in size and poor in workability and has a complicated shape and increased working man-hours, causing a problem of increased manufacturing cost.

The present invention was conceived in view of the situations and it is therefore an object of the present invention to provide a vehicle parking lock apparatus with reduced manufacturing cost.

The object indicated above can be achieved according to a first aspect of the present invention, which provides a vehicle parking lock device comprising: a parking rod that has a base end portion rotatably coupled to a detent plate, the parking rod being projected toward a leading end portion in association with rotation of the detent plate to a parking position; a tapered parking cam disposed at the leading end portion of the parking rod; and a cam guiding device that guides the parking cam moved together with the parking rod in association with the projection of the parking rod toward the leading end portion to move a parking lock pole rotatably disposed on a transmission case with the parking cam to a position of engagement with a parking lock gear rotated together with a transmission output member, (a) the parking rod being projected from inside of the transmission case toward an opening portion of the transmission case, (b) the cam guiding device including (b-1) a first guiding member in a cylindrical shape that has an inner guiding surface guiding the parking cam, the first guiding member being fitted immovably in a direction orthogonal to a shaft center into a first receiving surface formed into a cylindrical surface shape within the transmission case, (b-2) a second guiding member in a half cylindrical shape that is disposed subsequently to the first guiding member such that the second guiding member is received from a position on the side opposite to the parking lock pole by a second receiving surface formed adjacently in a shaft center direction to the first receiving surface within the transmission case and such that movement toward the parking lock pole is regulated by the first guiding member, the second guiding member having a tapered guiding concave surface that guides the parking cam toward the parking lock pole in association with the projection of the parking rod toward the leading end portion; and (b-3) a fixing member that is fixed to the opening portion of the transmission case, the fixing member being engaged with an end portion of the second guiding member to regulate the rotation of the second guiding member around the shaft center and the movement toward the opening portion of the transmission case.

A second aspect of the present invention provides the vehicle parking lock device of the first aspect of the invention, wherein the second guiding member has an inner circumferential surface including the tapered guiding concave surface and an outer circumferential surface that is a cylindrical convex curved surface, and wherein the tapered guiding concave surface has a center line of curvature displaced from a center line of curvature of the outer circumferential surface toward the parking lock pole by a predetermined amount.

A third aspect of the present invention provides the vehicle parking lock device of the second aspect of the invention, wherein the first receiving surface formed on the transmission case and the second receiving surface formed adjacently in a shaft center direction to the first receiving surface are formed concentrically with each other, and wherein the curvature radius of the second receiving surface is greater than the curvature radius of the first receiving surface.

A fourth aspect of the present invention provides the vehicle parking lock device of the third aspect of the invention, wherein (a) an end portion of the first guiding member closer to the second guiding member has a partially cylindrical portion in a semicircular shape formed to be located closer to the second receiving surface in the end portion with an unchanging curvature radius, and a partially tapered portion formed to be located closer to the parking lock pole in the end portion with a curvature radius increased toward the second guiding member so as to avoid interference between the parking cam guided toward the parking lock pole by the tapered guiding concave surface and the first guiding member, and wherein (b) an end portion of the inner circumferential surface of the second guiding member closer to the first guiding member is overlapped with the partially cylindrical portion of the first guiding member.

A fifth aspect of the present invention provides the vehicle parking lock device of the fourth aspect of the invention, wherein due to contact of the partially tapered portion of the first guiding member with a circumferential end surface of the second guiding member, relative rotation equal to or greater than a predetermined amount around the shaft center becomes impossible between the first guiding member and the second guiding member.

A sixth aspect of the present invention provides the vehicle parking lock device of any one of the first to fifth aspects of the invention, wherein (a) the second guiding member has an engagement protrusion formed on an end surface closer to the fixing member, wherein (b) the fixing member is a plate material with a cutout into which the engagement protrusion is fitted, and wherein (c) the fixing member is fixed to the opening portion of the transmission case with the engagement protrusion fitted in the, cutout while abutting on end surface of the second guiding member.

A seventh aspect of the present invention provides the vehicle parking lock device of the fourth aspect of the invention, wherein the first guiding member is made of one plate material bent by press working.

Effects of the Invention

According to the vehicle parking lock device of the first aspect of the invention, the parking rod is projected from the inside of the transmission case toward the opening portion of the transmission case, and the cam guiding device includes a first guiding member in a cylindrical shape that is fitted immovably in a direction orthogonal to a shaft center into a first receiving surface formed into a cylindrical surface shape in the transmission case; a second guiding member in a half cylindrical shape that is disposed subsequently to the first guiding member such that the second guiding member is received from a position on the side opposite to the parking lock pole by a second receiving surface formed adjacently in a shaft center direction to the first receiving surface within the transmission case and such that the movement toward the parking lock pole is regulated by the first guiding member, and that has a tapered guiding concave surface guiding the parking cam toward the parking lock pole in association with the projection of the parking rod toward the leading end portion; and a fixing member fixed to the opening portion of the transmission case and engaged with the end portion of the second guiding member to regulate the rotation of the second guiding member around the shaft center and the movement toward the opening portion of the transmission case. As a result, even when the second guiding member is constructed separately from the first guiding member and the fixing member, the second guiding member can be simplified into the functionally minimum required size and shape, and the first guiding member and the fixing member can respectively be simplified into the functionally minimum required sizes and shapes. Therefore, as compared to the case that the second guiding member is integrally configured with one or both of the first guiding member and the fixing member, since the second guiding member, the first guiding member, and the fixing member are reduced in size, are improved in workability, and make material costs lower, and the simplified shape increases options for a processing method, optimizes the processing method, and reduces working man-hours, the reduction of the manufacturing cost (total cost of parts) can be achieved.

According to the vehicle parking lock device of the second aspect of the invention, the second guiding member has the inner circumferential surface including the tapered guiding concave surface and the outer circumferential surface that is the cylindrical convex curved surface, and the tapered guiding concave surface has the center line of curvature displaced from the center line of curvature of the outer circumferential surface toward the parking lock pole by a predetermined amount, and therefore, as compared to the case that the center line of curvature of the tapered guiding concave surface is concentric with the center line of curvature of the outer circumferential surface, the outer diameter dimension of the second guiding member is reduced and the second guiding member is improved in workability and makes material cost lower, thereby reducing the manufacturing cost. It is also advantageous that the circumferential angle of the outer circumferential surface received by the transmission case is increased in the outer circumferential surface of the second guiding member. For example, when the end portion of the second guiding member closer to the first guiding member is overlapped with the first guiding member on the side opposite to the parking pole to regulate the movement of the second guiding member toward the parking pole, if the positional relationship is not changed between the inner circumferential guiding surface of the first guiding member and the tapered guiding concave surface of the second guiding member, and the same radial thickness is ensured in the end portion of the second guiding member closer to the first guiding member, the outer diameter dimension of the second guiding member is reduced and the circumferential angle of the outer circumferential surface received by the transmission case is increased in the outer circumferential surface of the second guiding member, as compared to the case that the center lines of curvature are concentric between the outer circumferential surface and the tapered guiding concave surface of the second guiding member.

According to the vehicle parking lock device of the third aspect of the invention, since the first receiving surface formed on the transmission case and the second receiving surface formed adjacently in a shaft center direction to the first receiving surface are formed concentrically with each other, and the curvature radius of the second receiving surface is greater than the curvature radius of the first receiving surface, finish cutting machining becomes easier on the first receiving surface and the second receiving surface of the transmission case and, therefore, the transmission case can inexpensively be manufactured.

According to the vehicle parking lock device of the fourth aspect of the invention, the end portion of the first guiding member closer to the second guiding member has a partially cylindrical portion in a semicircular shape formed to be located closer to the second receiving surface in the end portion with an unchanging curvature radius, and a partially tapered portion formed to be located closer to the parking lock pole in the end portion with a curvature radius increased toward the second guiding member so as to avoid interference between the parking cam guided toward the parking lock pole by the tapered guiding concave surface and the first guiding member, and the end portion of the inner circumferential surface of the second guiding member closer to the first guiding member is overlapped with the partially cylindrical portion of the first guiding member. As a result, the second guiding member is configured such that the movement toward the parking lock pole is regulated by the first guiding member.

According to the vehicle parking lock device of the fifth aspect of the invention, due to contact of the partially tapered portion of the first guiding member with the circumferential end surface of the second guiding member, the relative rotation equal to or greater than a predetermined amount around the shaft center becomes impossible between the first guiding member and the second guiding member. As a result, since the first guiding member and the second guiding member can relatively be rotated to each other by a predetermined angle, when the fixing member is assembled to the transmission case with the first guiding member and the second guiding member incorporated, the fixing member can easily be positioned relative to the transmission case while engaging with the second guiding member, thereby improving the assembly efficiency.

According to the vehicle parking lock device'of the sixth aspect of the invention, the second guiding member has the engagement protrusion formed on the end surface closer to the fixing member; the fixing member is a plate material with a cutout into which the engagement protrusion is fitted; and the fixing member is fixed to the opening portion of the transmission case with the engagement protrusion fitted in the cutout while abutting on the end surface of the second guiding member. Such a configuration prevents the second guiding member from moving (coming out) in the shaft center direction and rotating around the shaft center.

According to the vehicle parking lock device of the seventh aspect of the invention, the first guiding member is made of one plate material bent by press working and therefore has higher mass productivity and makes material cost lower as compared to the case of molding by sintering (powder metallurgy), thereby reducing the manufacturing cost.

Figure 6:
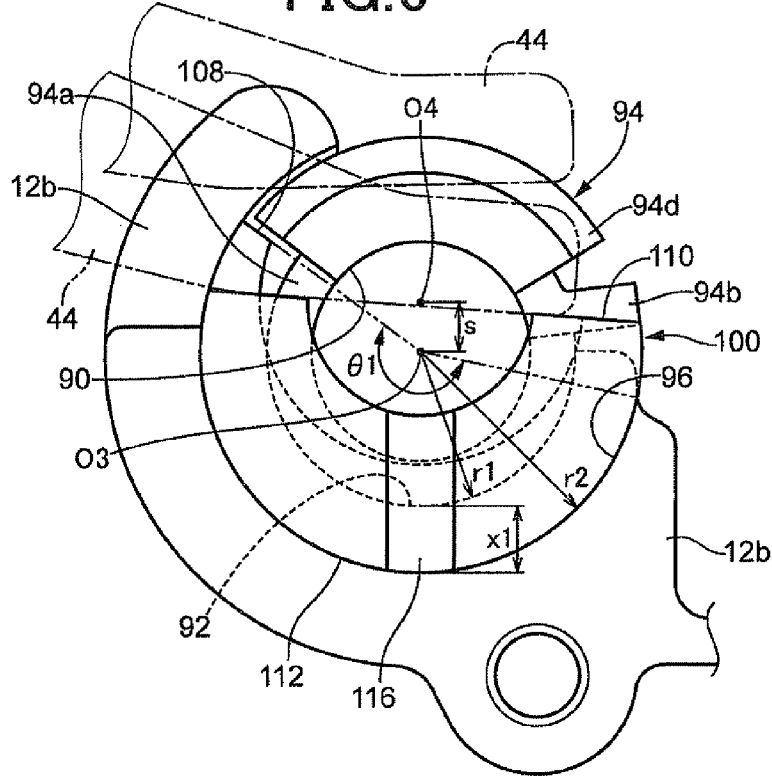
FIG. 6 is a diagram of the cam guide and the sleeve of FIG. 3 and is an arrow view taken along VI-VI of FIG. 3.
Figure 7:
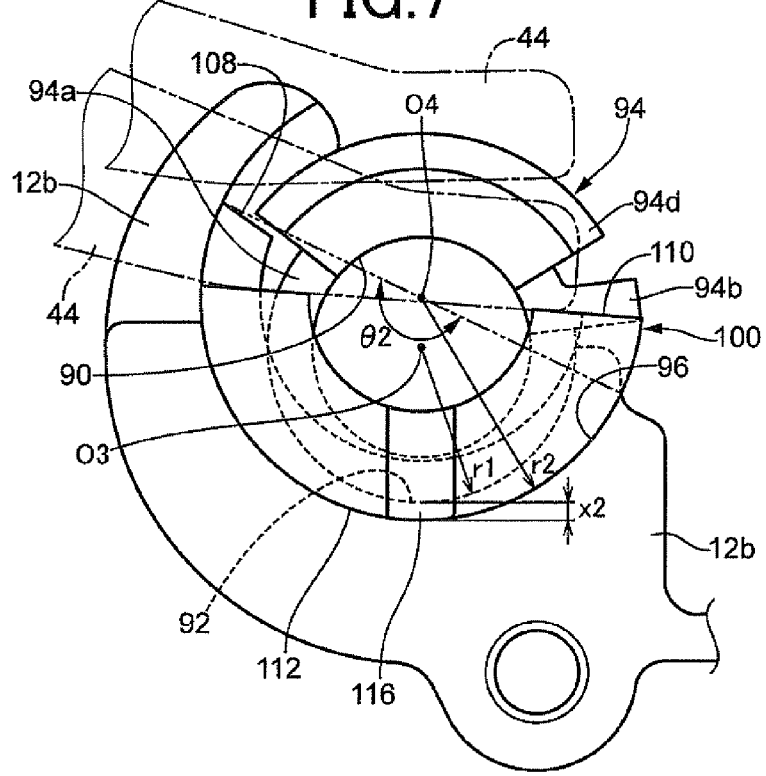

FIG. 7 is a diagram of a state when the shaft center of the outer circumferential surface and the second receiving surface is displaced to be identical to the center line of curvature of the tapered guiding concave surface without changing the relative positional relationship between the cam guide and the parking lock pole, the relative positional relationship between the tapered guiding concave surface of the sleeve and the parking lock pole, and the curvature radius of the outer circumferential surface of the sleeve as compared to the embodiment depicted in FIG. 6.

Figure 8:
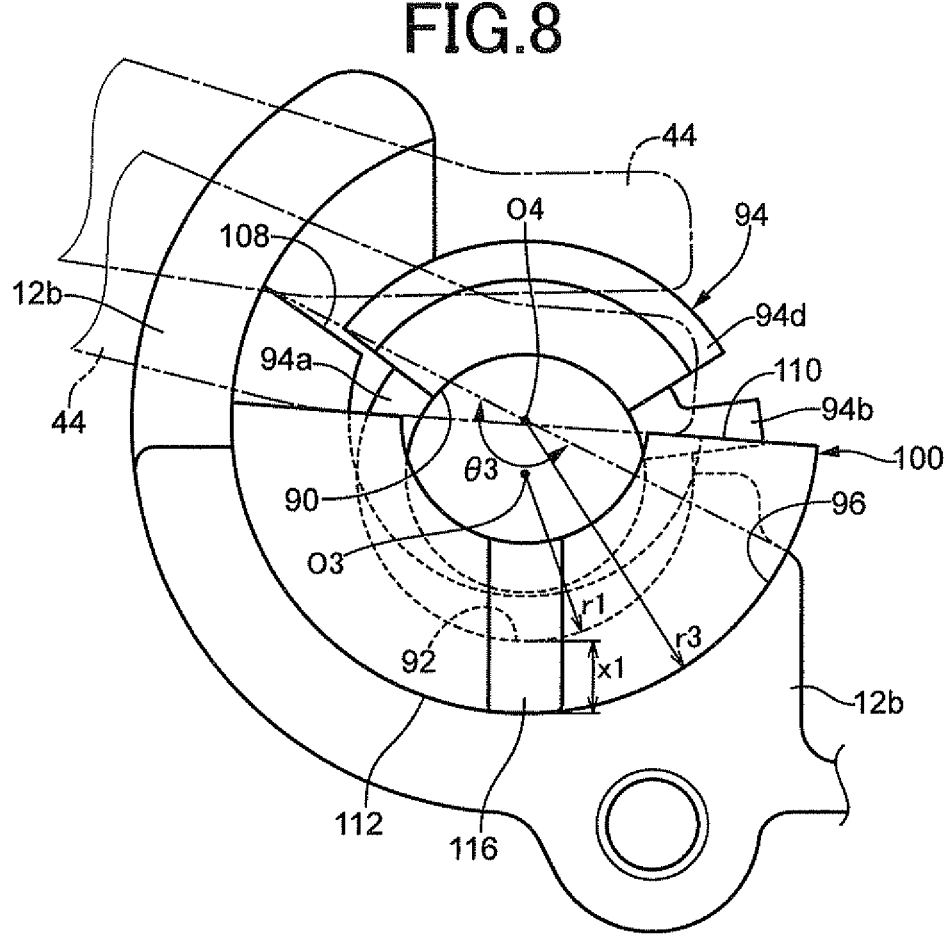

FIG. 8 is a diagram of a state when the curvature radius of the outer circumferential surface of the sleeve is increased to a curvature radius so as to ensure the radial thickness of the one end portion of the sleeve closer to the cam guide same as the radial thickness of this embodiment as compared to the state depicted in FIG. 7.

MODE FOR CARRYING OUT THE INVENTION

One embodiment of the present invention will now be described in detail with reference to the drawings. In the embodiment, the figures are simplified or deformed as needed and are not necessarily accurately drawn in terms of dimensional ratios, shapes, etc., of portions.

Embodiment

Figure 1:
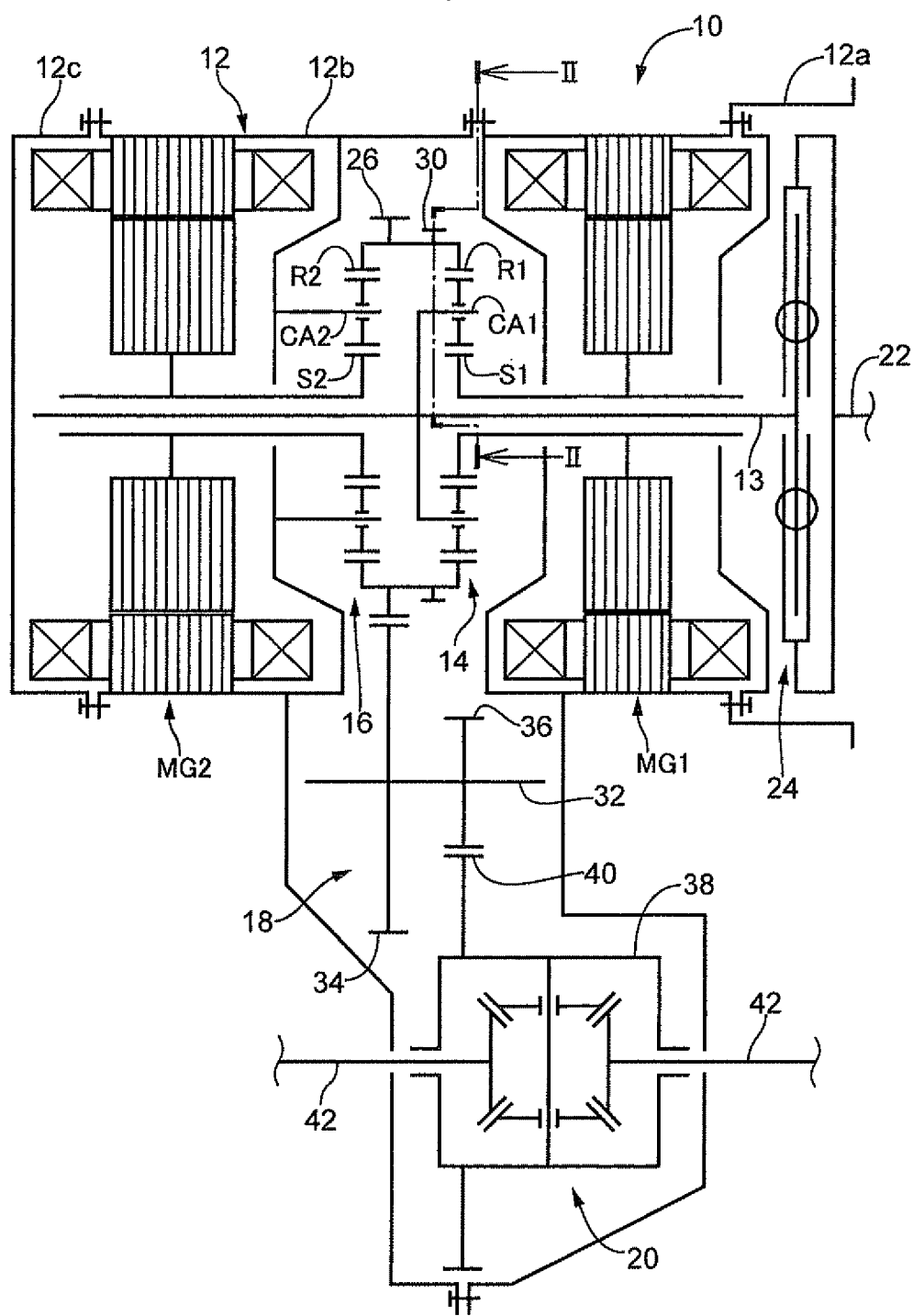
FIG. 1 is a schematic for explaining a configuration of a transaxle of one embodiment of the present invention.

FIG. 1 is a schematic for explaining a configuration of a transaxle 10 of one embodiment of the present invention. In FIG. 1, the transaxle 10 is preferably employed in an FF (front-engine front-drive) type hybrid vehicle. The transaxle 10 includes a rotatably supported input shaft 13, a first motor generator MG1 and a second motor generator MG2 acting as electric motors and electric generators, a first planetary gear device 14 and a second planetary gear device 16 of single pinion type, a reduction gear device 18, and a differential gear device 20 in a housing 12 consisting of a case 12a, a case 12b, and a cover 12c made of, for example, die-cast aluminum assembled to each other. The cases 12a, 12b, and the cover 12c correspond to a transmission case of the present invention.

The input shaft 13 is disposed concentrically with an output member (crankshaft) 22 of, for example, an engine not depicted that is a main drive force for running. The input shaft 13 is coupled to the output member 22 in a power transmittable manner via a damper device 24 for absorbing and damping pulsations due to abrupt torque variations.

The first planetary gear device 14 acts as a power distribution mechanism for mechanically distributing a torque generated by the engine to the first motor generator MG1 and the reduction gear device 18. The first planetary gear device 14 includes a carrier CA1 coupled to the input shaft 13, a sun gear S1 coupled to the first motor generator MG1, and a ring gear R1 fixedly disposed on an inner circumferential surface of a drive gear 26 corresponding to a transmission output member of the present invention. A parking lock gear 30 making up a portion of a vehicle parking lock device 28 of one embodiment of the present invention is fixedly disposed on an outer circumferential surface of an end portion of the drive gear 26 closer to the first motor generator MG1.

The second planetary gear device 16 acts as a reduction mechanism of the second motor generator MG2. The second planetary gear device 16 includes a sun gear S2 coupled to the second motor generator MG2, a carrier CA2 coupled to the case 12b, and a ring gear R2 fixedly disposed on the inner circumferential surface of the drive gear 26.

The first motor generator MG1 is mainly used as an electric generator and is rotationally driven via the planetary gear mechanism 14 by the engine to generate an electric energy so as to charge, for example, an electric storage device such as a battery with the electric energy. The first motor generator MG1 is used not only as the electric generator but also as an electric motor at the start of the engine and during high-speed running, for example.

The second motor generator MG2 is mainly used as an electric motor and rotationally drives the drive gear 26 alone or in conjunction with the engine. The second motor generator MG2 is used not only as the electric motor but also as an electric generator during deceleration of a vehicle, for example.

The reduction gear device 18 is disposed between the drive gear 26 and the differential gear device 20 and acts as a reduction mechanism. The reduction gear device 18 includes the drive gear 26, a driven gear 34 fixedly disposed on a counter shaft 32, which is disposed in parallel with the input shaft 13, to engage with the drive gear 26, a drive gear 36 fixedly disposed on the counter shaft 32, and a driven gear 40 fixedly disposed on a differential case 38 of the differential gear device 20 to engage with the drive gear 36.

The differential gear device 20 is of a well-known bevel gear type and respectively rotationally drives a pair of left and right drive shafts 42 while allowing a rotational difference.

In the transaxle 10 configured as described above, a torque generated by at least one of the engine, the first motor generator MG1, and the second motor generator MG2 is transmitted via the drive gear 26, the reduction gear device 18, and the differential gear device 20 to the pair of the left and right drive shafts 42.

The vehicle parking lock device 28 will hereinafter be described in detail that fixes the parking lock gear 30 rotated together with the drive gear 26 non-rotatably around a shaft center O1 of the parking lock gear 30 so as to lock the rotation of the transaxle 10.

Figure 2:
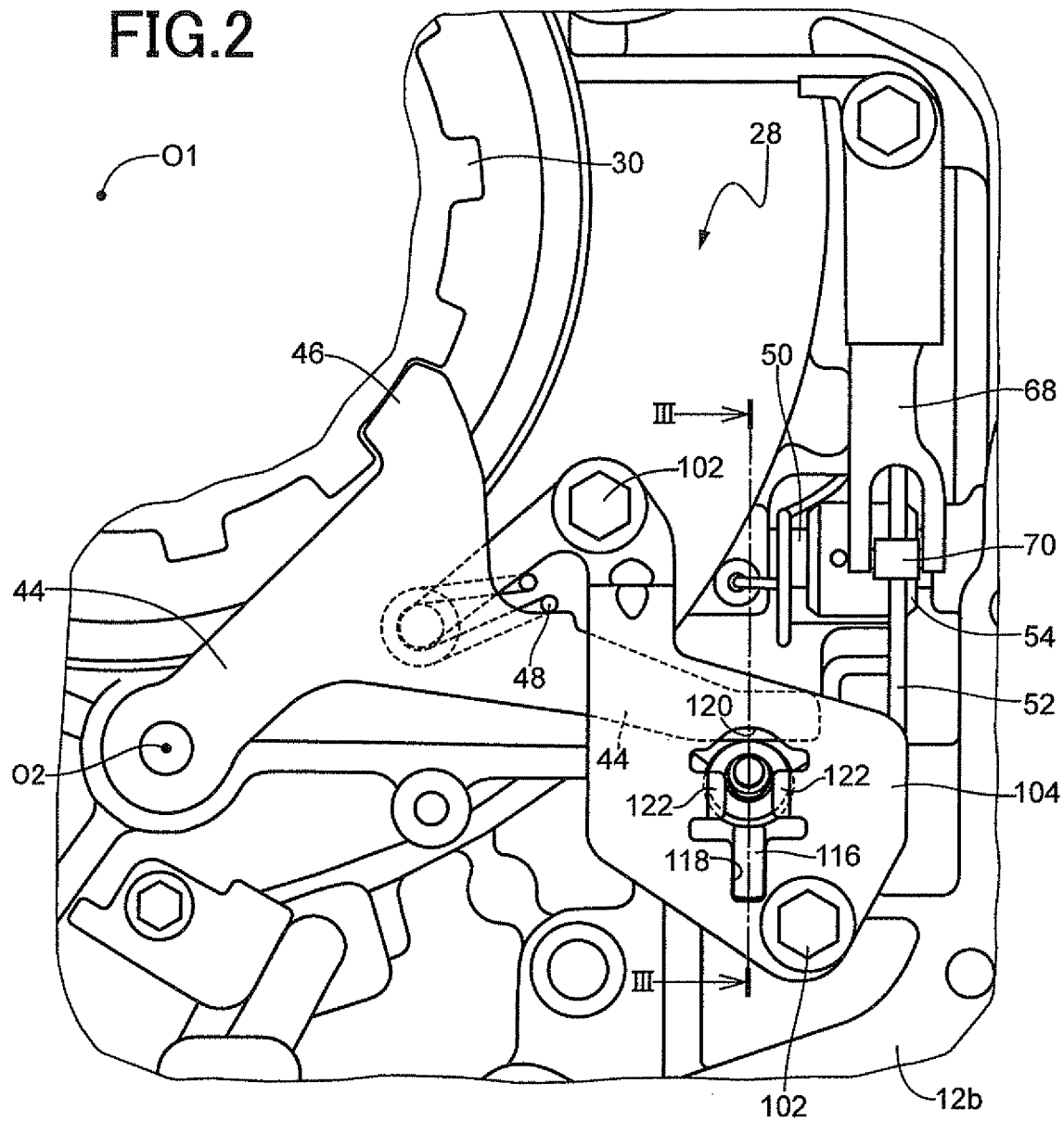
FIG. 2 is a partial cross-sectional view of the transaxle, depicting a cross section of an arrow view portion taken along II-II of FIG. 1, and is a diagram of a main portion of the vehicle parking lock device.
Figure 3:
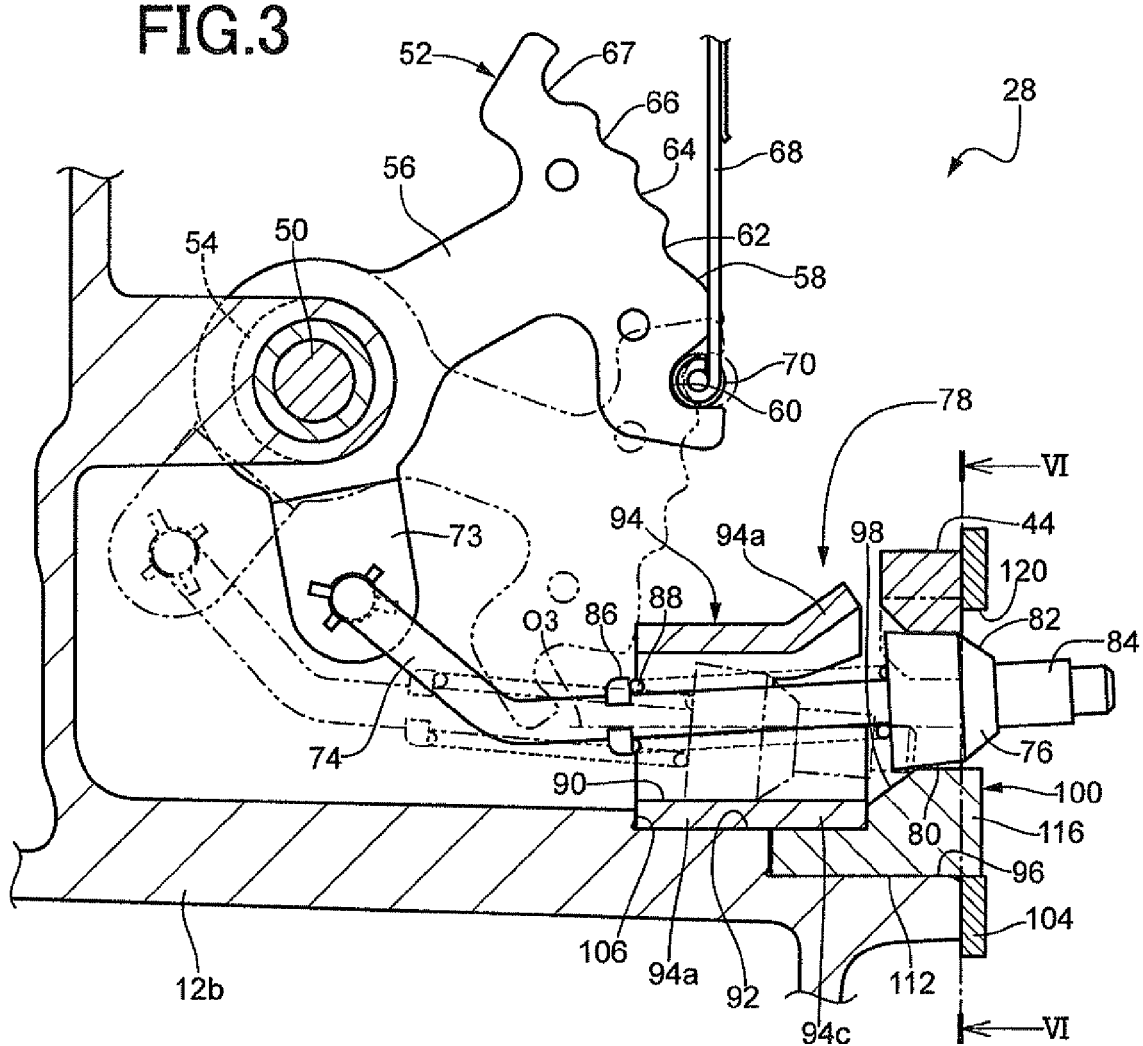
FIG. 3 is a partial cross-sectional view of the transaxle 10, depicting a cross section of an arrow view portion taken along III-III of FIG. 2, and is a cross-sectional view of an operating portion of the vehicle parking lock device.

FIG. 2 is a partial cross-sectional view of the transaxle 10, depicting a cross section of an arrow view portion taken along II-II of FIG. 1, and is a diagram of a main portion of the vehicle parking lock device 28 in the case 12b viewed from the opening side of the case 12b. FIG. 3 is a partial cross-sectional view of the transaxle 10, depicting a cross section of an arrow view portion taken along III-III of FIG. 2, and is a cross-sectional view of an operating portion of the vehicle parking lock device 28.

In FIG.S. 2 and 3, the vehicle parking lock device 28 includes the parking lock gear 30, and a parking lock pole 44 having a base end portion supported rotatably around a shaft center O2 by the case 12b and disposed such that the parking lock pole 44 can come closer to and go away from the parking lock gear 30 as a result of the rotation around the shaft center O2. The parking lock pole 44 has a hook portion 46 that engages with the parking lock gear 30 when rotated closer to the parking lock gear 30. FIG. 2 depicts a state of the hook portion 46 of the parking lock pole 44 engaging with the parking lock gear 30. The parking lock pole 44 is rotated between an engaging position at which the parking lock gear 30 is non-rotatably fixed because the hook portion 46 engages with the parking lock gear 30 as a result of rotation toward the parking lock gear 30 as depicted in FIG. 2 and a non-engagement position at which the parking lock gear 30 is allowed to rotate because the hook portion 46 does not engage with the parking lock gear 30 as a result of rotation away from the parking lock gear 30. The parking lock pole 44 is always biased toward the non-engagement position by a biasing spring 48 and is positioned at the non-engagement position unless an external force other than the biasing force is applied.

The vehicle parking lock device 28 includes a plate-shaped detent plate 52 fixedly disposed on a shift control shaft 50, which rotates depending on a switching operation of a shift position of the transaxle 10, and rotated to any one of a plurality of preset rotation positions. The detent plate 52 is positioned at any one of preset parking, reverse, neutral, drive, and manual positions in accordance with a shape of a cam surface 58 of the outer circumferential end edge thereof and is also referred to as a parking lever or a moderating plate. As depicted in FIG. 3, the detent plate 52 has a first concave portion 60 for positioning the detent plate 52 at the parking position, a second concave portion 62 for positioning the detect plate 52 at the reverse position, a third concave portion 64 for positioning the detent plate 52 at the neutral position, a fourth concave portion 66 for positioning the detent plate 52 at the drive position, and a fifth concave portion 67 for positioning the detent plate 52 at the manual position, which are formed on a cam surface 58 of an outer circumferential end edge portion of a first arm portion 56 in a fan shape protruded toward the outer circumference from a boss portion 54 of the detent plate 52, An engagement roller 70 abuts on the cam surface 58 and is rotatably supported by a leading end portion of a plate-shaped spring 68 having a base end portion fixed to the case 12b. The spring 68 biases the engagement roller 70 toward the cam surface. 58 with a predetermined pressing force. Therefore, basically, the detent plate 52 is positioned at the parking position as indicated by a solid line in FIG. 3 when the engagement roller 70 drops into the first concave portion 60; the detent plate 52 is positioned at the reverse position when the engagement roller 70 drops into the second concave portion 62; the detent plate 52 is positioned at the neutral position when the engagement roller 70 drops into the third concave portion 64; the detent plate 52 is positioned at the drive position when the engagement roller 70 drops into the fourth concave portion 66; and the detent plate 52 is positioned at the manual position as indicated by a dashed-two dotted line in FIG. 3 when the engagement roller 70 drops into the fifth concave portion 67.

The vehicle parking lock device 28 includes a parking rod 74 that has a base end portion rotatably coupled to a second arm portion 73 protruding toward the outer circumference from the boss portion 54 of the detent plate 52 and that is projected toward a leading end portion in association with rotation of the detent plate 52 toward the parking position, a tapered parking cam 76 disposed at the leading end portion of the parking rod 74, and a cam guiding device 78 that guides the parking cam 76 moved together with the parking rod 74 in association with the projection of the parking rod 74 toward the leading end portion and that guides the parking cam 76 such that the parking lock pole 44 rotatably disposed on the case 12b is moved to an engagement position for engagement with the parking lock gear 30 rotated together with the drive gear 26 when the detent plate 52 is rotated from the reverse position to the parking position.

The parking rod 74 is disposed such that the parking rod 74 is protruded from the inside of the case 12b toward an opening portion of the case 12b closer to the first motor generator MG1 in association with the rotation of the detent plate 52 toward the parking position. In FIG. 3, the parking rod 74 and the detent plate 52 indicated by dashed-two dotted lines represent a state of being positioned at the manual position, and the parking rod 74 and the detent plate 52 indicated by solid lines represent a state of being positioned at the parking position.

The parking cam 76 includes a first tapered cam surface 80 formed into a tapered shape having a relatively shallow slope with a diameter reduced toward the leading end of the parking rod 74, and a second tapered cam surface 82 disposed adjacently to the first tapered cam surface 80 on the side of the leading end portion of the parking rod 74 and formed into a tapered shape having a relatively steep slope with a diameter reduced toward the leading end of the parking rod 74, and is a cylindrical member fitted to the leading end of the parking rod 74 movably in a shaft center direction. A cylindrical stopper 84 is fitted closer to the leading end portion of the parking rod 74 than the parking cam 76, and a caulking portion 86 is formed closer to the base end portion of the parking rod 74 than the parking cam 76. The parking cam 76 is biased toward the stopper 84 by a coil spring 88 interposed in a pressurized state between the caulking portion 86 and the parking cam 76

In the case 12b, a first receiving surface 92 is formed into a cylindrical surface shape, and a second receiving surface 96 having a larger diameter than the first receiving surface 92 is formed adjacently to the first receiving surface 92 on the opening side of the case 12b and has a shaft center O3 in common with the first receiving surface 92. The cam guiding device 78 includes: a cylindrical cam guide (first guiding member) 94 that has an inner circumferential cam surface 90 (inner circumferential guiding surface) guiding the parking cam 76 and that is fitted into the first receiving surface 92 formed into a cylindrical surface shape in the case 12b, so as not to move in a radial direction, i.e., in a direction orthogonal to the shaft center O3; a half cylindrical sleeve (second guiding member) 100 that is disposed adjacently to the cam guide 94 on the opening side of the case 12b such that the sleeve 100 is received from a position on the side opposite to the parking lock pole 44 by the second receiving surface 96 adjacent to the first receiving surface 92 on the opening side of the case 12b and such that the movement toward the parking lock pole 44 is regulated by the cam guide 94, and that has a tapered guiding concave surface 98 guiding the parking cam 76, which is moved together with the parking rod 74, toward the parking lock pole 44 in association with the projection of the parking rod 74 toward the leading end portion due to the rotation of the detent plate 52 from the reverse position to the parking position; and a stopper plate (fixing member) 104 fixed to the opening portion of the case 12b by bolts 102, for example, and engaged with an end portion of the sleeve 100 to regulate the rotation of the sleeve 100 around the shaft center O3 and the movement toward the opening portion of the case 12b.

Figure 4:
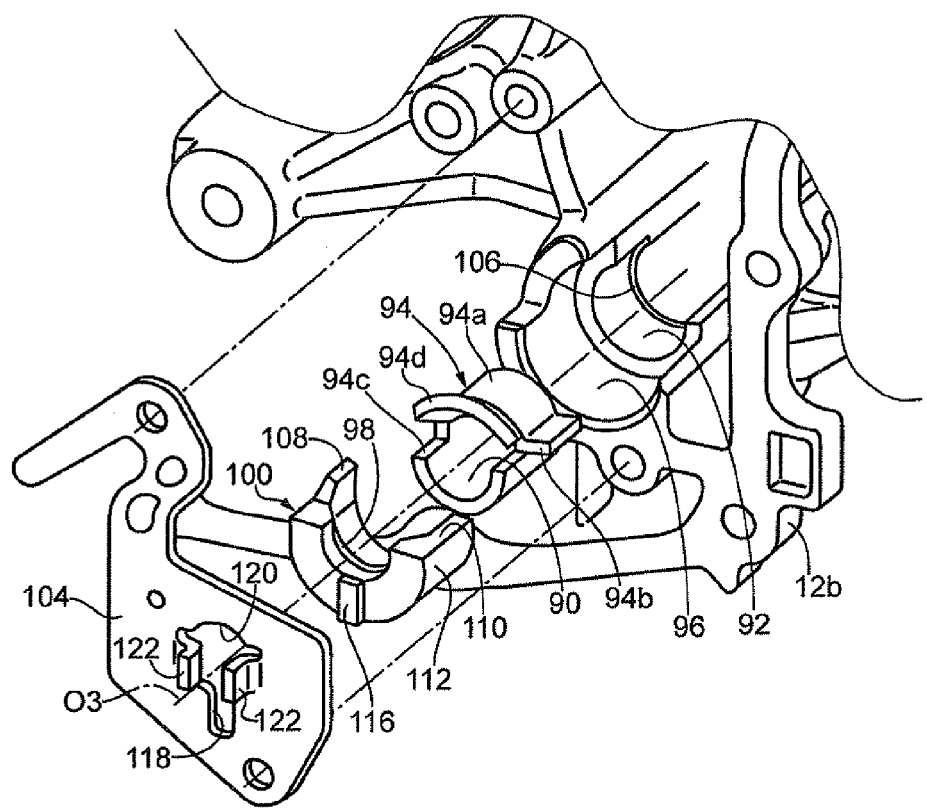
FIG. 4 is an exploded perspective view of the cam guide, the sleeve, and the stopper plate sequentially assembled from the opening of the case.
Figure 5:
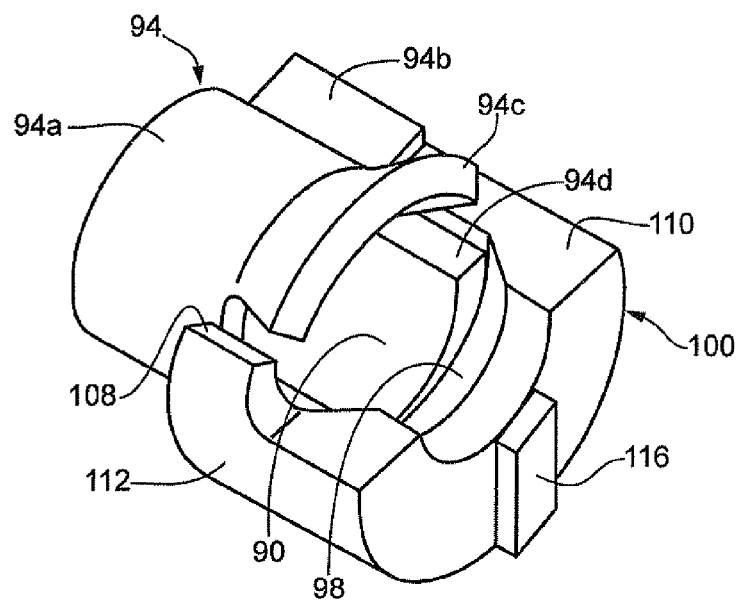
FIG. 5 is a perspective view of the cam guide and the sleeve assembled in the case shown in FIG. 3.

FIG. 4 is an exploded perspective view of the cam guide 94, the sleeve 100, and the stopper plate 104 sequentially assembled from the opening of the case 12b. FIG. 5 is a perspective view of the cam guide 94 and the sleeve 100 assembled in the case 12b. FIG. 6 is a diagram of the cam guide 94 and the sleeve 100 assembled in the case 12b and is an arrow view taken along VI-VI of FIG. 3. In FIG. 6, for convenience of description, the parking cam 76 is not depicted, and the parking lock pole 44 is depicted by a dashed-dotted line as a state when the detent plate 52 is at the parking position, and is depicted by a dashed-two dotted line as a state when the detent plate 52 is at the reverse position, the neutral position, the drive position, and the manual position, i.e., at the non-parking positions. As depicted in FIG.S. 3 to 6, the first receiving surface 92 is formed into a partially cylindrical surface of about 240 degrees around the shaft center O3 in the direction substantially orthogonal to the opening surface of the case 12b, i.e., in the direction parallel to the shaft center O1 of the parking lock gear 30, and the second receiving surface 96 is formed adjacently to the first receiving surface 92 in the shaft center O3 direction and concentrically with the first receiving surface 92. As depicted in FIG. 6, a curvature radius r2 of the second receiving surface 96 is formed to be larger than a curvature radius r1 of the first receiving surface 92. The first receiving surface 92 and the second receiving surface 96 are formed by performing the finish cutting machining to the case 12b made of die-cast aluminum with a cylindrical rotary blade such as an end mill, for example.

On one end portion of the cam guide 94 on the side opposite to the sleeve 100, a cylindrical portion 94a in a cylindrical shape is formed that has a curvature radius from the shaft center O3 substantially identical to the curvature radius r1 of the first receiving surface 92 and that is received by the first receiving surface 92, and a projecting portion 94b in a flat plate shape is formed that has the same width dimension as the dimension of the cylindrical portion 94a in the direction of the shaft center O2 and that radially projects from the cylindrical portion 94a toward the outer circumference. On the other end portion of the cam guide 94 on the side of the sleeve 100, a partially cylindrical portion 94c in a semicircular shape is formed that is located closer to the second receiving surface 96 in the other end portion and that has a curvature radius from the shaft center O3 unchanged in the shaft center O3 direction (unchanged from the curvature radius r1 of the cylindrical portion 94a), and a partially tapered portion 94d is formed that is located closer to the parking lock pole 44 in the other end portion and that has a curvature radius from the shaft center O3 increased in the shaft center O3 direction toward the sleeve 100 (made larger than the curvature radius r1 of the cylindrical portion 94a) so as to avoid interference between the parking cam 76 guided toward the parking lock pole 44 by the tapered guiding concave surface 98 and the cam guide 94. The cam guide 94 is formed such that the other end portion projects from the first receiving surface 92 toward the side of the second receiving surface 96 while the end surface of the one end portion abuts on a stepped-portion end surface 106 formed adjacently to the first receiving surface 92 of the case 12b on the side opposite to the second receiving surface 96. In other words, the length of the cam guide 94 in the shaft center O3 direction is formed longer than the length of the first receiving surface 92 in the shaft center O3 direction. In this embodiment, the cam guide 94 is made of one plate material bent by press working.

One end portion of the sleeve 100 closer to the cam guide 94 is formed into a partially cylindrical shape of about 220 degrees in the circumferential direction, and is fitted into a semi-annular gap formed between the second receiving surface 96 and the partially cylindrical portion 94c of the cam guide 94. One end portion of the inner circumferential surface of the sleeve 100 closer to the cam guide 94 is overlapped with the partially cylindrical portion 94c of the cam guide 94 and, as a result, the movement of the sleeve 100 toward the parking lock pole 44 is regulated. A radial thickness x1 of the one end portion of the sleeve 100 closer to the cam guide 94 is set to a necessary and sufficient value in terms of strength. Since a partially tapered portion 94d of the cam guide 94 contacts with an end surface 108 and an end surface 110 in the circumferential direction of one end portion of the sleeve 100, the relative rotation equal to or greater than a predetermined amount around the shaft center O3 becomes impossible between the cam guide 94 and the sleeve 100. The other end portion of the sleeve 100 on the side opposite to the cam guide 94 is formed into a partially cylindrical shape of about 205 degrees in the circumferential direction. The tapered guiding concave surface 98 is formed on the inner circumferential surface of the other end of the sleeve 100. The sleeve 100 has an outer circumferential surface 112 that is a cylindrical convex curved surface having a curvature radius from the shaft center O3 substantially identical to the curvature radius r2 of the second receiving surface 96, and a center line O4 of curvature of the tapered guiding concave surface 98 is displaced by a predetermined distance (predetermined amount) s toward the parking lock pole 44 from the shaft center O3 that is identical to a center line of curvature of the outer circumferential surface 112 parallel to the center line O4 of curvature. One end portion on the outer circumferential surface 112 of the sleeve 100 closer to the cam guide 94 is fitted into the second receiving surface 96 and in contact with the second receiving surface 96 over a range of a predetermined angle θ1 in the circumferential direction. Since the predetermined angle θ1 is about 205 degrees in this embodiment, the movement of the sleeve 100 toward the parking lock pole 44 is regulated not only by the partially cylindrical portion 94c of the cam guide 94 but also by the second receiving surface 96. In this embodiment, the sleeve 100 is molded by sintering (powder metallurgy), for example.

An engagement protrusion 116 is formed on the end surface of the sleeve 100 closer to the stopper plate 104. The stopper plate 104 is a plate material that includes a cutout 118 into which the engagement protrusion 116 is fitted so as to prevent the rotation of the sleeve 100 and the movement toward the opening of the case 12b, a regulating hole 120 that interferes with the parking cam 76 guided toward the parking lock pole 44 in association with the projection of the parking rod 74 toward the leading end in accordance with the rotation of the detent plate 52 to the parking position so as to regulate a position, i.e., a lifted amount of the parking cam 76, and a pair of rod guide portions 122 projected on the side opposite to the sleeve 100 with the center line O4 of curvature of the tapered guiding concave surface 98 interposed therebetween so as to guide the parking rod 74 projected toward the leading end such that the posture thereof is achieved at a predetermined position. The stopper plate 104 is fixed to the case 12b by the bolts 102 with the engagement protrusion 116 of the sleeve 100 fitted in the cutout 118 while abutting on an end surface 114 of the sleeve 100. As a result, the sleeve 100 is bound non-rotatably around the shaft center O3 and immovably toward the opening portion of the case 12b. The cam guide 94 abuts on the sleeve 100 bound immovably toward the opening portion of the case 12b and is therefore bound immovably toward the opening portion of the case 12b.

In the vehicle parking lock device 28 configured as described above, when the detent plate 52 is rotated to the manual position and other non-parking positions (the drive position, the neutral position, or the reverse position) as indicated by the dashed-two dotted line in FIG. 3, the parking cam 76 does not lift the parking lock pole 44 and, therefore, the parking lock pole 44 is positioned at the non-engagement position as indicated by a dashed-two dotted line in FIG. 3. When the detent plate 52 is rotated to the parking position as indicated by the solid line in FIG. 3, the parking cam 76 lifts the parking lock pole 44 and, therefore, the parking lock pole 44 is positioned at the engagement position as indicated by a solid line in FIG. 3 against the biasing force of the biasing spring 48.

In the vehicle parking device 28 of this embodiment, as described above, since the one end portion of the sleeve 100 closer to the cam guide 94 is overlapped with the partially cylindrical portion 94c of the cam guide 94 on the side opposite to the parking lock pole 44, the movement of the sleeve 100 toward the parking lock pole 44 is regulated. Additionally, since the outer circumferential surface 112 of the one end portion of the sleeve 100 is fitted into the second receiving surface 96 and in contact with the second receiving surface 96 over a range of about 205 degrees in the circumferential direction, the movement of the sleeve 100 toward the parking lock pole 44 is regulated.

FIG. 7 is a diagram of a state when the shaft center of the outer circumferential surface 112 and the second receiving surface 96 is displaced to be identical to the center line O4 of curvature of the tapered guiding concave surface 98 without changing the relative positional relationship between the cam guide 94 and the parking lock pole 44, the relative positional relationship between the tapered guiding concave surface 98 of the sleeve 100 and the parking lock pole 44, and the curvature radius of the outer circumferential surface 112 of the sleeve 100 as compared to the embodiment depicted in FIG. 6. As depicted in FIG. 7, if the shaft center of the outer circumferential surface 112 and the center line O4 of curvature of the tapered guiding concave surface 98 are not decentered from each other, a radial distance x2 is reduced between the second receiving surface 96 and the partially cylindrical portion 94c of the cam guide 94. Therefore, it is difficult to overlap the one end portion of the sleeve 100 closer to the cam guide 94 with the partially cylindrical portion 94c of the cam guide 94 on the side opposite to the parking lock pole 44 in terms of strength. Additionally, since the outer circumferential surface 112 of the sleeve 100 is fitted into the second receiving surface 96 and in contact with the second receiving surface 96 over a range of a predetermined angle θ2, for example, about 180 degrees, in the circumferential direction, the second receiving surface 96 cannot regulate the movement of the sleeve 100 toward the parking lock pole 44.

FIG. 8 is a diagram of a state when the curvature radius of the outer circumferential surface 112 of the sleeve 100 is increased to a curvature radius r3 so as to ensure the radial thickness of the one end portion of the sleeve 100 closer to the cam guide 94 same as the radial thickness x1 of this embodiment as compared to the state depicted in FIG. 7. As depicted in FIG. 8, even if the shaft center of the outer circumferential surface 112 and the center line O4 of curvature of the tapered guiding concave surface 98 are not decentered from each other, since the radial distance of the one end portion of the sleeve 100 closer to the cam guide 94 is ensured by the necessary and sufficient radial thickness x1 in terms of strength, the one end portion of the sleeve 100 closer to the cam guide 94 can be overlapped with the partially cylindrical portion 94c of the cam guide 94 on the side opposite to the parking lock pole 44. However, as is the case with FIG. 7, since the outer circumferential surface 112 of the sleeve 100 is fitted into the second receiving surface 96 and in contact with the second receiving surface 96 over a range of a predetermined angle θ3, for example, about 180 degrees, in the circumferential direction, the second receiving surface 96 cannot regulate the movement of the sleeve 100 toward the parking lock pole 44. Since the curvature radius of the outer circumferential surface 112 of the sleeve 100 is increased, the sleeve 100 increases in size, has poor workability, and makes material cost higher, thereby increasing the manufacturing cost. Since the second receiving surface 96 is also increased, the workability of the second receiving surface 96 is reduced and the layout property of the cam guiding device 78 including the sleeve 100 in the case 12b is deteriorated.

As described above, according to the vehicle parking lock device 28 of the present embodiment, the parking rod 74 is projected from the inside of the case (transmission case) 12b toward the opening portion of the case 12b, and the cam guiding device 78 includes a cam guide (first guiding member) 94 in a cylindrical shape that is fitted immovably in a direction orthogonal to a shaft center O3 into a first receiving surface 92 formed into a cylindrical surface shape in the case 12b; a sleeve (second guiding member) 100 in a half cylindrical shape that is disposed subsequently to the cam guide 94 adjacently in a shaft center O3 direction such that the sleeve 100 is received from a position on the side opposite to the parking lock pole 44 by a second receiving surface 96 formed adjacently in a shaft center O3 direction to the first receiving surface 92 within the case 12b and such that the movement toward the parking lock pole 44 is regulated by cam guide 94, and that has a tapered guiding concave surface 98 guiding the parking cam 76 toward the parking lock pole 44 in association with the projection of the parking rod 74 toward the leading end portion by rotating of the detent plate 52 from the reverse position to the parking position; and a stopper plate (fixing member) 104 fixed to the opening portion of the case 12b and engaged with the end portion of the sleeve 100 to regulate the rotation of the sleeve 100 around the shaft center O3 and the movement toward the opening portion of the case 12b. As a result, even when the sleeve 100 is constructed separately from the cam guide 94 and the stopper plate 104, the sleeve 100 can be simplified into the functionally minimum required size and shape, and the cam guide 94 and the stopper plate 104 can respectively be simplified into the functionally minimum required sizes and shapes. Therefore, as compared to the case that the sleeve 100 is integrally configured with one or both of the cam guide 94 and the stopper plate 104, since the sleeve 100, the cam guide 94, and the stopper plate 104 are reduced in size, are improved in workability, and make material costs lower, and the simplified shape increases options for a processing method, optimizes the processing method, and reduces working man-hours, the reduction of the manufacturing cost (total cost of parts) can be achieved.

According to the vehicle parking lock device 28 of the present embodiment, the sleeve 100 has the inner circumferential surface including the tapered guiding concave surface 98 and the outer circumferential surface that is the cylindrical convex curved surface, and the shaft center O3 that is the center line of curvature of the tapered guiding concave surface 98 is displaced from the center line O4 of curvature of the outer circumferential surface 112 toward the parking lock pole 44 by a predetermined distance (predetermined amount) s, and therefore, as compared to the case that the center line (shaft center O3) of curvature of the tapered guiding concave surface 98 is concentric with the center line O4 of curvature of the outer circumferential surface 112, the outer diameter dimension of the sleeve 100 is reduced and the sleeve 100 is improved in workability and makes material cost lower, thereby reducing the manufacturing cost. It is also advantageous that the circumferential angle of the outer circumferential surface 112 received by the case 12b is increased in the outer circumferential surface 112 of the sleeve 100. For example, when the end portion of the sleeve 100 closer to the cam guide 94 is overlapped with the cam guide 94 on the side opposite to the parking pole 44 to regulate the movement of the sleeve 100 toward the parking pole 44, if the positional relationship is not changed between the inner circumferential guiding surface 90 of the cam guide 94 and the tapered guiding concave surface 98 of the sleeve 100, and the same radial thickness is ensured in the end portion of the sleeve 100 closer to the cam guide 94, the outer diameter dimension of the sleeve 100 is reduced and the circumferential angle of the outer circumferential surface 112 received by the case 12b is increased in the outer circumferential surface 112 of the sleeve 100, as compared to the case that the center lines of curvature are concentric between the outer circumferential surface 112 and the tapered guiding concave surface 98 of the sleeve 100.

According to the vehicle parking lock device 28 of the present embodiment, since the first receiving surface 92 formed on the case 12b and the second receiving surface 96 formed adjacently in a shaft center O3 direction to the first receiving surface 92 are formed concentrically with each other, and the curvature radius r2 of the second receiving surface 96 is greater than the curvature radius r1 of the first receiving surface 92, finish cutting machining becomes easier on the first receiving surface 92 and the second receiving surface 96 of the case 12b and, therefore, the case 12b can inexpensively be manufactured.

According to the vehicle parking lock device 28 of the present embodiment, another end portion of the cam guide 94 closer to the sleeve 100 has a partially cylindrical portion 94c in a semicircular shape formed to be located closer to the second receiving surface 96 in the another end portion with an unchanging curvature radius from the shaft center O3 in the shaft center O3 direction, and a partially tapered portion 94d formed to be located closer to the parking lock pole 44 in the another end portion with a curvature radius from the shaft center O3 in the shaft center O3 direction increased toward the sleeve 100 so as to avoid interference between the parking cam 76 guided toward the parking lock pole 44 by the tapered guiding concave surface 98 and the cam guide 94, and the end portion of the inner circumferential surface of the sleeve 100 closer to the cam guide 94 is overlapped with the partially cylindrical portion of the cam guide 94 in the opposite side of the parking pole 44. As a result, the sleeve 100 is configured such that the movement toward the parking lock pole 44 is regulated by the cam guide 94.

According to the vehicle parking lock device 28 of the present embodiment, due to abutting contact (contact) of the partially tapered portion 94d of the cam guide 94 with the circumferential end surface 108 and end surface 110 of the portion of the sleeve 100 in the cam guide 94 side, the relative rotation equal to or greater than a predetermined amount around the shaft center O3 becomes impossible between the cam guide 94 and the sleeve 100. As a result, since the cam guide 94 and the sleeve 100 can relatively be rotated to each other by a predetermined angle, when the stopper plate 104 is assembled to the case 12b with the cam guide 94 and the sleeve 100 incorporated, the stopper plate 104 can easily be positioned relative to the case 12b while engaging with the sleeve 100, thereby improving the assembly efficiency.

According to the vehicle parking lock device 28 of the present embodiment, the sleeve 100 has the engagement protrusion 116 formed on the end surface 114 closer to the stopper plate 104; the stopper plate 104 is a plate material with a cutout 118 into which the engagement protrusion 116 is fitted; and the stopper plate 104 is fixed to the opening portion of the case 12b by a bolt 102 with the engagement protrusion 116 fitted in the cutout 118 while abutting on the end surface 114 of the sleeve 100. Such a configuration prevents the sleeve 100 from moving (coming out) in the shaft center O3 direction and rotating around the shaft center O3.

According to the vehicle parking lock device 28 of the present embodiment, the cam guide 94 is made of one plate material bent by press working and therefore has higher mass productivity and makes material cost lower as compared to the case of molding by sintering (powder metallurgy), thereby reducing the manufacturing cost.

Although one embodiment of the present invention has been described in detail with reference to the drawings, the present invention is not limited to this embodiment and may be implemented in another form.

For example, although the center line O4 of curvature of the tapered guiding concave surface 98 of the sleeve 100 is displaced from the center line of curvature of the outer circumferential surface 112, i.e., the shaft center O3, toward the parking lock pole 44 by the predetermined distance s in the embodiment, the displacement may not necessarily be made. Even in such a case, a certain effect is acquired.

Although the one end portion of the outer circumferential surface 112 of the sleeve 100 closer to the cam guide 94 is fitted into the second receiving surface 96 and in contact with the second receiving surface 96 over a range of the predetermined angle θ1 in the circumferential direction and the predetermined angle θ1 is set to about 205 degrees in this embodiment, this is not a limitation and the sleeve 100 may be configured such that the movement toward the parking lock pole 44 is regulated by the second receiving surface 96 as long as the predetermined angel θ1 is set greater than 180 degrees. The outer circumferential surface 112 of the sleeve 100 may not necessarily be fitted into the second receiving surface 96 and in contact with the second receiving surface 96 over greater than 180 degrees in the circumferential direction. In other words, for example, by overlapping the one end portion of the sleeve 100 closer to the cam guide 94 with the partially cylindrical portion 94c of the cam guide 94 on the side opposite to the parking lock pole 44, the movement of the sleeve 100 toward the parking lock pole 44 may be regulated by the cam guide 94.

Although the cam guide 94 is made of one plate material bent by press working in the embodiment, the cam guide 94 may be manufactured with molding by powder metallurgy or may be manufactured from a steel pipe material by machining.

Although, on the cam guide 94, the partially tapered portion 94d is formed that is located closer to the parking lock pole 44 in the other end portion and that has a curvature radius from the shaft center O3 increased in the shaft center O3 direction toward the sleeve 100 (made larger than the curvature radius r1 of the cylindrical portion 94a) so as to avoid interference between the parking cam 76 guided toward the parking lock pole 44 by the tapered guiding concave surface 98 and the cam guide 94 in the embodiment, the partially tapered portion 94d may not necessarily be provided.

Although the vehicle parking lock device 28 is disposed on the transaxle 10 of an FF type hybrid vehicle in the embodiment, the present invention is applicable to a transmission included in a vehicle of another drive type such as FR type, for example, and is applicable to a transmission included in a vehicle that includes only an engine as a drive power source or an electric vehicle, for example.

The embodiment described above is merely one embodiment and, although not exemplary illustrated one by one, the present invention can be implemented in variously modified and altered forms based on the knowledge of those skilled in the art without departing from the spirit thereof.

The invention claimed is:

1. A vehicle parking lock device comprising: a parking rod that has a base end portion rotatably coupled to a detent plate, the parking rod being projected toward a leading end portion in association with rotation of the detent plate to a parking position; a tapered parking cam disposed at the leading end portion of the parking rod; and a cam guiding device that guides the parking cam moved together with the parking rod in association with the projection of the parking rod toward the leading end portion to move a parking lock pole rotatably disposed on a transmission case with the parking cam to a position of engagement with a parking lock gear rotated together with a transmission output member, the parking rod being projected from inside of the transmission case toward an opening portion of the transmission case, the cam guiding device including a first guiding member in a cylindrical shape that has an inner guiding surface guiding the parking cam, the first guiding member being fitted immovably in a direction orthogonal to a shaft center into a first receiving surface formed into a cylindrical surface shape within the transmission case, a second guiding member in a half cylindrical shape that is disposed subsequently to the first guiding member such that the second guiding member is received from a position on the side opposite to the parking lock pole by a second receiving surface formed adjacently in a shaft center direction to the first receiving surface within the transmission case and such that movement toward the parking lock pole is regulated by the first guiding member, the second guiding member having a tapered guiding concave surface that guides the parking cam toward the parking lock pole in association with the projection of the parking rod toward the leading end portion; and a fixing member that is fixed to the opening portion of the transmission case, the fixing member being engaged with an end portion of the second guiding member to regulate the rotation of the second guiding member around the shaft center and the movement toward the opening portion of the transmission case.

2. The vehicle parking lock device of claim 1, wherein the second guiding member has an inner circumferential surface including the tapered guiding concave surface and an outer circumferential surface that is a cylindrical convex curved surface, and wherein the tapered guiding concave surface has a center line of curvature displaced from a center line of curvature of the outer circumferential surface toward the parking lock pole by a predetermined amount.

3. The vehicle parking lock device of claim 2, wherein the first receiving surface formed on the transmission case and the second receiving surface formed adjacently in a shaft center direction to the first receiving surface are formed concentrically with each other, and wherein the curvature radius of the second receiving surface is greater than the curvature radius of the first receiving surface.

4. The vehicle parking lock device of claim 3, wherein
an end portion of the first guiding member closer to the second guiding member has a partially cylindrical portion in a semicircular shape formed to be located closer to the second receiving surface in the end portion with an unchanging curvature radius, and a partially tapered portion formed to be located closer to the parking lock pole in the end portion with a curvature radius increased toward the second guiding member so as to avoid interference between the parking cam guided toward the parking lock pole by the tapered guiding concave surface and the first guiding member, and wherein an end portion of the inner circumferential surface of the second guiding member closer to the first guiding member is overlapped with the partially cylindrical portion of the first guiding member.

5. The vehicle parking lock device of claim 4, wherein due to contact of the partially tapered portion of the first guiding member with a circumferential end surface of the second guiding member, relative rotation equal to or greater than a predetermined amount around the shaft center becomes impossible between the first guiding member and the second guiding member.

6. The vehicle parking lock device of claim 2, wherein the second guiding member has an engagement protrusion formed on an end surface closer to the fixing member, wherein the fixing member is a plate material with a cutout into which the engagement protrusion is fitted, and wherein the fixing member is fixed to the opening portion of the transmission case with the engagement protrusion fitted in the cutout while abutting on end surface of the second guiding member.

7. The vehicle parking lock device of claim 3, wherein the second guiding member has an engagement protrusion formed on an end surface closer to the fixing member, wherein the fixing member is a plate material with a cutout into which the engagement protrusion is fitted, and wherein the fixing member is fixed to the opening portion of the transmission case with the engagement protrusion fitted in the cutout while abutting on end surface of the second guiding member.

8. The vehicle parking lock device of claim 4, wherein the second guiding member has an engagement protrusion formed on an end surface closer to the fixing member, wherein the fixing member is a plate material with a cutout into which the engagement protrusion is fitted, and wherein the fixing member is fixed to the opening portion of the transmission case with the engagement protrusion fitted in the cutout while abutting on end surface of the second guiding member.

9. The vehicle parking lock device of claim 5, wherein the second guiding member has an engagement protrusion formed on an end surface closer to the fixing member, wherein the fixing member is a plate material with a cutout into which the engagement protrusion is fitted, and wherein the fixing member is fixed to the opening portion of the transmission case with the engagement protrusion fitted in the cutout while abutting on end surface of the second guiding member.

10. The vehicle parking lock device of claim 4, wherein the first guiding member is made of one plate material bent by press working.

11. The vehicle parking lock device of claim 1, wherein the second guiding member has an engagement protrusion formed on an end surface closer to the fixing member, wherein the fixing member is a plate material with a cutout into which the engagement protrusion is fitted, and wherein the fixing member is fixed to the opening portion of the transmission case with the engagement protrusion fitted in the cutout while abutting on end surface of the second guiding member.

* * * * *